United States Patent
Eluri et al.

(10) Patent No.: US 11,232,090 B2
(45) Date of Patent: Jan. 25, 2022

(54) COMPRESSED ROW STATE INFORMATION

(71) Applicant: SAP SE, Walldorf (DE)

(72) Inventors: Amarnadh Sai Eluri, Pleasanton, CA (US); Vimal Chandran Satheesh, Palo Alto, CA (US); Mihnea Andrei, Issy les Moulineaux (FR); Prateek Basavapur Swamy, Sunnyvale, CA (US)

(73) Assignee: SAP SE, Walldorf (DE)

(*) Notice: Subject to any disclaimer, the term of this patent is extended or adjusted under 35 U.S.C. 154(b) by 89 days.

(21) Appl. No.: 16/374,472

(22) Filed: Apr. 3, 2019

(65) Prior Publication Data
US 2020/0133934 A1   Apr. 30, 2020

Related U.S. Application Data

(60) Provisional application No. 62/752,317, filed on Oct. 29, 2018.

(51) Int. Cl.
*G06F 16/23* (2019.01)
*G06F 16/21* (2019.01)

(52) U.S. Cl.
CPC ........ *G06F 16/2329* (2019.01); *G06F 16/219* (2019.01); *G06F 16/2308* (2019.01)

(58) Field of Classification Search
CPC ........ G06F 16/173–1767; G06F 16/178–1794; G06F 16/182–1873; G06F 16/23–2393
See application file for complete search history.

(56) References Cited

U.S. PATENT DOCUMENTS 9,665,609 B2   5/2017  Andrei
2016/0147448 A1*  5/2016  Schreter ............... G06F 3/0604
                                                                 711/159

OTHER PUBLICATIONS

Wikipedia, Snapshot Isolation, 2018, 5 pages, retrieved on Mar. 25, 2020, from the Internet: URL:https://en.wikipedia.org/w/index.php?title=Snapshot_isolation&oldid=856731724.

* cited by examiner

*Primary Examiner* — Robert W Beausoliel, Jr.
*Assistant Examiner* — Nirav K Khakhar
(74) *Attorney, Agent, or Firm* — Mintz Levin Cohn Ferris Glovsky and Popeo, P.C.

(57) ABSTRACT

In one aspect, there is provided a method. The method may include accessing a multi-version concurrency control block providing row state for a block of rows in a table of a database, the multi-version concurrency control block including a header portion and a data portion, the header portion including a type indicator indicating whether all of the rows of the block are visible to a plurality of threads at a database management system or invisible to the plurality of threads at the database management system. Related systems, methods, and articles of manufacture are also disclosed.

19 Claims, 7 Drawing Sheets

COMPRESSED ROW STATE INFORMATION

RELATED APPLICATION

This application claims priority to U.S. Provisional Application No. 62/752,317 entitled "COMPRESSED ROW STATE INFORMATION" and filed on Oct. 29, 2018, the disclosure of which is incorporated herein by reference in its entirety.

BACKGROUND

Data frequently changes in the rows of tables of a database management system. Concurrency control (CC) protocols are designed to maintain consistency during these data changes and improve the throughput of a database management system. A way to maintain concurrency control is to maintain a lock on data in a database table when data is being manipulated by one or more threads in the database management system. The lock prevents conflicting operations, such as a read and a write on the same row of a table. Another way to maintain CC is to maintain a snapshot (at a given instant of time) of a table in the database management system. The one or more threads may then manipulate data from the same snapshot of the table.

A multi-version concurrency control (MVCC) is a concurrency control mechanism that uses the snapshot mechanism. In the MVCC when a read thread reads a row from a table, the write thread may write to the row in the table without being blocked by the read thread. For example, when a read thread reads the data from a row in a table at the same time as the write thread updates or deletes the data from the row, the read thread will use the old copy of the data in the row. And, when the first write thread deletes or updates the data in the row, there is a second write thread that is already using the data in the row, and the first write thread will wait until the second write thread completes before modifying the row. Alternatively, the changes made by the first write thread may be removed or rolled back. Since table data can be constantly changing, a database management system keeps track of multiple versions without affecting memory space.

SUMMARY

In one aspect, there is provided a method. The method may include accessing a multi-version concurrency control block providing row state for a block of rows in a table of a database, the multi-version concurrency control block including a header portion and a data portion, the header portion including a type indicator indicating whether all of the rows of the block are visible to a plurality of threads at a database management system or invisible to the plurality of threads at the database management system.

In some variations, one or more features disclosed herein including the following features may optionally be included in any feasible combination. The type indicator may change from a visible type indicating all of the rows of the block are visible to the plurality of threads to a row state vector type representation or a list type representation for the row state of each of the plurality of rows in the table of the database. The type indicator may change from the row state vector type representation or the list type representation to the visible type. When the visible type indication is present in the header portion, the data portion is empty. When the row state vector type representation or the list type representation are present, the data portion includes the row state for each row in the block at the table of the database. The type indicator may change from an invisible type indicating all of the rows of the block are invisible to the plurality of thread to a row state vector type representation or a list type representation for the row state of each of the plurality of rows in the table of the database. The type indicator may change from the row state vector type representation or the list type representation to the invisible type. The accessing may include a write to the multi-version concurrency control block, the write performed under a lock to inhibit changes to the multi-version concurrency control block. The accessing may further include: accessing a plurality of multi-version concurrency control blocks, each of the multi-version concurrency control blocks mapped to a corresponding set of rows in the table of the database, a first multi-version concurrency control block having a visible type, a second multi-version concurrency control block having an invisible type, and a third multi-version concurrency control block having a list type or a row state vector type. The method may further include iterating over the plurality of multi-version concurrency control blocks to obtain to obtain the row state of the corresponding set of rows in the table of the database, wherein a row state accessor reads, as part of the iteration, a first header portion of the first multi-version concurrency control block to determine the row state as being the visible type without reading a first data portion of the first multi-version concurrency control block, wherein the row state accessor reads, as part of the iteration, a second header portion of the second multi-version concurrency control block to determine the row state as being the invisible type without reading a second data portion of the second multi-version concurrency control block, and wherein the row state accessor reads, as part of the iteration, a third header portion of the third multi-version concurrency control block, and when the third header portion indicates the list type or the row state vector type, further reading the third data portion of the third multi-version concurrency control block to determine the row state.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the multiplication of database objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
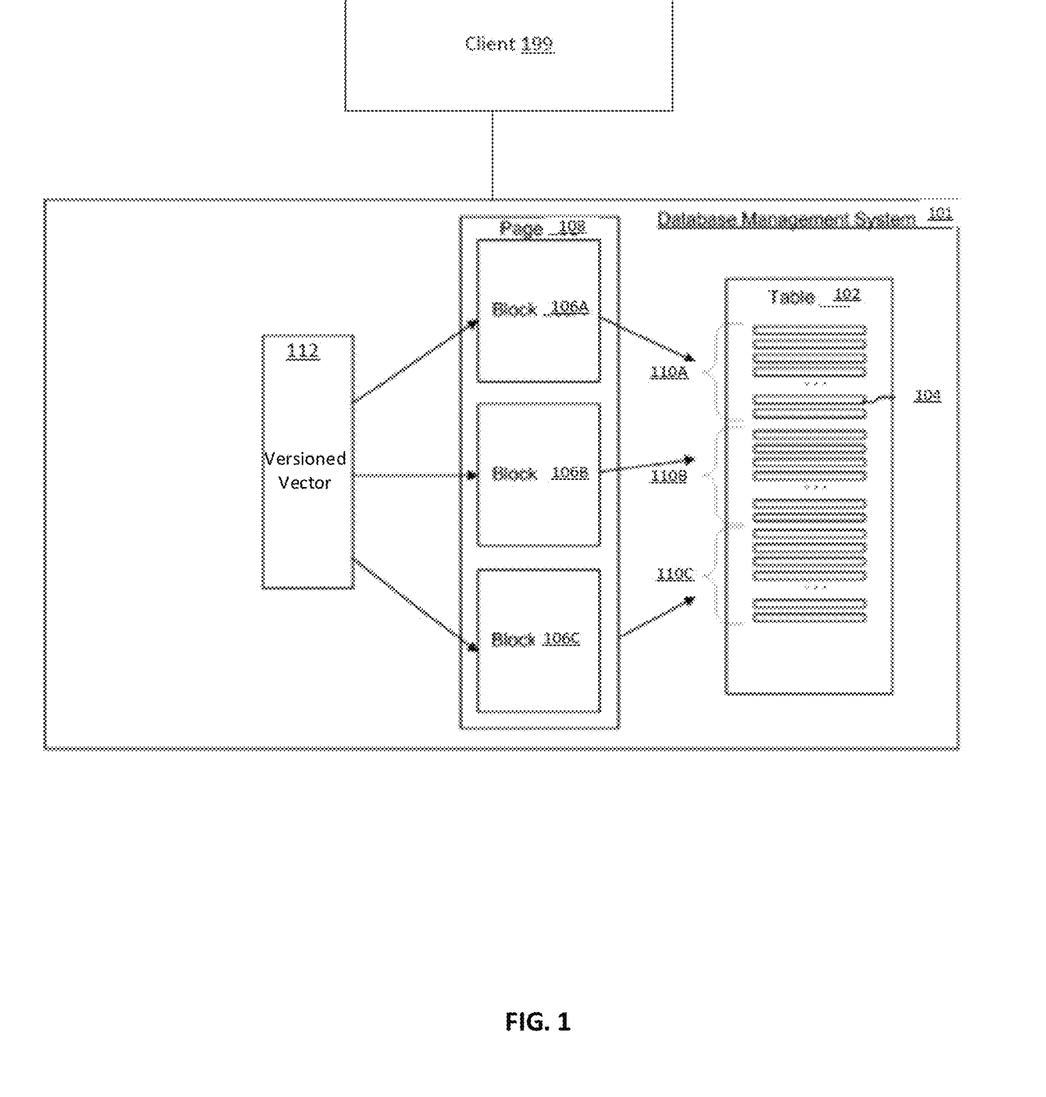
FIG. 1 depicts an example of a database management system, in accordance with some example embodiments.

FIG. 1 is a block diagram 100 of a database management system 101 that includes MVCC logic, according to some example embodiments. The database management system 101 may also include an index structure implemented using a versioned vector module 112. The versioned vector 112 provides luckless access to blocks 106A-C or other blocks associated with a range of position values.

The database management system 101 also includes one or more tables, such as table 102. The table 102 may be a combination of one or more tables. For example, table 102 may be an in-memory table that is stored in volatile memory, although portions of the table may be a disk-resident table stored in non-volatile memory as well. The table 102 may be considered a hybrid table. The hybrid table may include an in-memory component and a disk-resident component. In a hybrid table for example, pages that include newly inserted and updated rows may be stored in an in-memory component and pages that store data that is read by database management system 201 may be stored in a disk resident component.

In the example of FIG. 1, the table 102 may be associated with one or more MVCC blocks 106A-C, for example. The MVCC blocks provide MVCC information, such as the state (e.g., row state) of a row or block or rows in table 102 (e.g., row state). For example, MVCC block 106A provides row state information regarding row block at 110A, while MVCC block 106B provide information regarding row block 110B.

In the example of FIG. 1, the table 102 includes multiple rows 104. When a client 199 issues instructions that manipulate data in database management system 101 these instructions may manipulate data in one or more rows 104 of a table 102. Example instructions include insert, update, or delete operations on rows 104. One or more instructions may be referred to as transactions. The transactions issued by the client 199 to the database 101 may be active transactions. Active transactions made to the rows 104 may be temporary in database management system 101, but active transactions may become permanent transactions when the client issues a "commit" instruction. Upon a "commit" instruction, the data changes made to rows 104 of table 102 become permanent and visible to other threads in database management system 101. After the "commit" instruction, the data changes to rows 104 become visible based on the read snapshot timestamp as well. The read snapshot timestamp is a copy of a system timestamp at the time of the beginning of the transaction.

Multiple threads in database management system 101 may access data in the same row 104 of table 102. For example, multiple clients may issue requests that manipulate data in the same row of a same table. This may cause a thread to perform a transaction on the same row 104 in parallel with other threads. A thread is a set of instructions (which are managed by database management system 101) causing performance of a specified task. The database management system 101 may be configured with MVCC information and/or MVCC logic to determine the visibility (or correct value) for a row in table 102 based on, for example, time stamp information. As noted, after transactions are "committed," the changes to rows 104 in table 102 become permanent and thus visible to other threads. For example, a given row at table 102 with data inserted or updated becomes visible to multiple threads after a commit to the database, while a given row at table 102 with data deleted (or not committed) may become invisible to multiple threads. The visibility, invisibility, and other information about a row may provide row state information about that row.

To track the state of the rows 104, the database management system 101 includes or has access to MVCC blocks 106A-C (also referred to as CRS MVCC blocks). For example, an MVCC block 106A may provide MVCC information including row state information regarding the state of a corresponding block of rows, such as the range of rows 110A at table 102. As noted, this MVCC information may include row state information indicative of whether a row's state is visible, invisible, and/or the like. In the example of FIG. 1, the MVCC blocks 106A-C may be stored in a memory page 108. The MVCC blocks 106A-C may include, as noted, MVCC information (e.g., row state information and the like) for corresponding row blocks 110A-C. In some implementation, each MVCC block includes a header and a data portion that includes the MVCC or row state information for a corresponding block of rows, such as 110A, 110B, etc.

The MVCC information may also include for rows 104 additional row state information such as whether changes made to the rows 104 are visible or invisible to other threads in database management system 101. Row state information may include "visible," "check creation timestamp (inserted row)", "invisible," "check_creation and deletion timestamp (deleted row)," and/or other state information with respect to a row at the table 102.

The blocks of rows 110A, 110B, and 110C may be represented as row positions of the rows 104 in table 102 or as a range of positions of rows 104. In FIG. 1, the row block 110A includes a block of rows 110A having row positions 1-1012, row block 110B having row positions 1024-2047, row block 110C includes rows 104 having row positions 2048-3071, and so forth through the rows of table 102 as well as other tables. The row position may represent a logical row number in table 102. For example, a row position gives a physical location of a row, and the row position may also be an index into the vector holding the rows. And, each row position maps to a physical location in memory where the MVCC data is stored for the associated row.

In some embodiments, each of the MVCC blocks 106A, 106B, etc. are configured provide row state information, some of which may be implemented as compressed row state (CRS) information to provide a CRS MVCC block. The phrase "CRS MVCC block" is also referred to herein as MVCC block or CRS block. Each CRS MVCC block may provide row state information for a set of rows, such as a block of 1024 rows (1K rows).

In some example embodiments, the CRS MVCC block, such as 106A, 106B, etc., further includes a header portion and a data portion. In some example embodiments, the header portion includes information, such as an indication of the type of MVCC information found in the data portion. In some example embodiments, the header portion includes a visible stub type and/or an invisible stub type, although the header portion may include other types as well. When the invisible stub type or the visible stub type is found at the header, there is no need to read or decode the data portion because the state of the entire row block is known based on the stub type (e.g., all rows having a visible row state or all rows having an invisible row state).

Figure 2:
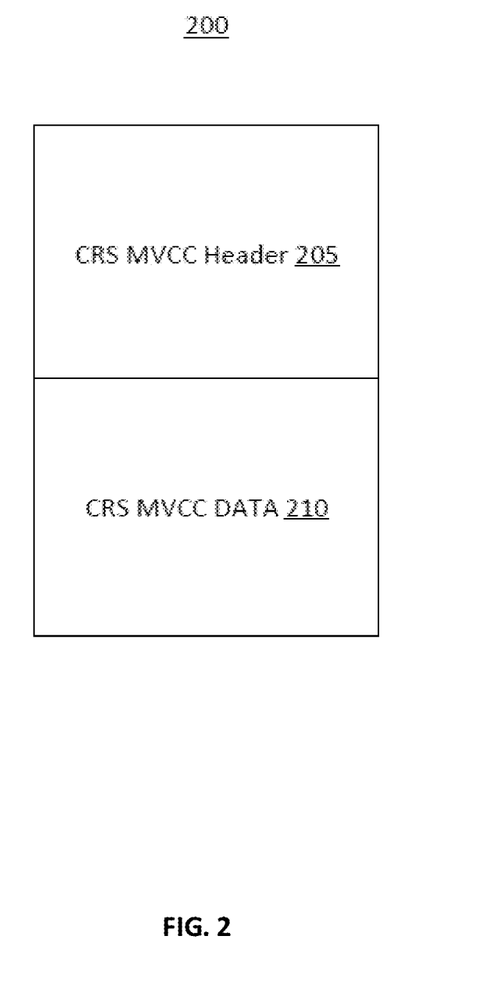
FIG. 2 depicts an example of a CRS MVCC block, in accordance with some example embodiments.

FIG. 2 depicts an example of a CRS MVCC block 200, in accordance with some example embodiments. The CRS MVCC block 200 includes a header 205 and a data block 210.

In some embodiments, the header 205 may include an indication of the block version, an indication of the block type, a block size, and a starting row position. The version indicates the version of the MVCC block (e.g., different versions of blocks may have different types of headers or formats). The block size indicates the size of the block of rows in table 102 covered by block 200, and the starting row position indicates the starting row of the block or rows. For example, the block size indicated in the header 205 may indicate that the CRS block 200 has a size of 1024 rows, such as 1024 rows at 110A, and the starting row positon may indicate row zero for block 110A. However, the CRS block corresponding to row block 110B may have a starting row positon that indicates the start of the first row of block 110B (e.g., 1023+1). The header types of the header 205 may be of one or more of the following types: a type of stub visible, a type of stub invisible, a type of row state vector, and a type of list. These types are described further below.

The data 210 of CRS MVCC block 200 portion may include MVCC information. For example, if the header 205 indicates the type is row state vector, the data 210 includes a function or vector that provides the row state vector information for each of the rows in block 110A, for example. If the header type indicates list, the data 210 includes row-state information listed for each individual row in the block 110A. If the header type indicates stub visible, the MVCC information in the data portion 205 may not be present or, alternatively, may include an indicator that the row block 110A corresponds to rows all having a visible row state. If the header type indicates invisible stub, the MVCC information in the data portion 205 may not be present or, alternatively may include an indicator that the row block 110A corresponds to rows all having an invisible row state.

In some embodiments, each CRS MVCC block 200 may include a header 205. The header 205 may include, as noted, a type, although the header may include additional information such as block version, block size, and/or the like. When the header 205 includes, as a type, list, the list may indicate that the data portion 210 includes MVCC information for the corresponding rows in table 102 in a list format. The list representation stores row slate information for each row as an array of entries (e.g., a list of 16 entries in the case of 1024 rows per row block) having a 2-byte value in each entry indicative of the row state of the rows in table 102 and/or other information including default row state information. This 2-byte value may represent an encoded representation of the row position in the table and the row state. As this CRS MVCC block is representing 1024 (1K) rows in table 102 for example, 9 bits are sufficient to represent an offset in the block (e.g., offset ranges from 0 to 1023) and 2 bits for the row state. In this example, the 11 bits are sufficient to identify each row in the block of rows in table 102 and the corresponding row state of each row. To have better access and byte alignment, a 2-byte space may be used for each entry in the list. For example, if the CTS block for given 1K range is stub and DTS is sparse block, there are more rows in table 102 with a visible row state, so this can be represented by using the ListRSChunk with visible type as default row state value for all the rows with the exception of the list of rows present in the row state information. The list type may be used when creating the row state information while loading MVCC data or while creating or populating the MVCC data for new fragments (as part of delta merge or optimize compression or repartitions), although it may be used at other times as well. For example, if the insertion timestamp block for a given range of rows, such as rows 0-1023 at block 110A, is garbage collected and very few rows are deleted in the range, there are more rows with always_visible row state, which becomes a candidate for list representation as a row state block with a default row state as type visible with the exception rows in the list.

When the header 205 includes, as a type, the row state (RS) vector, the RS vector may indicate that the data portion 210 includes a compact vector representation for the row state of the corresponding rows (which would be more compact when compared to the list type format noted above). For example, 2 bits for each row may be reserved in a block. In this example, an array of 32 words may be used to represent the current row state of 1024 rows, so logic may return (or access) the required row state information.

When the header 205 includes, as a type, the visible stub, the visible stub type may indicate that the data portion 210 corresponds to rows that are all visible, in accordance with some embodiments. For example, the visible stub indicates that all of the block a rows such as 110B are considered visible, such as committed and thus visible to threads. To illustrate further, the visible stub in the block header 205 may indicate that all 1K rows (e.g., 1024-2048 rows of block 110B in table 102) are visible. Referring to FIG. 1, when the block 106A includes a header having a visible stub indication, the range of rows 110B in table 202 are all visible. When this is the case, the data portion 210 of the block may be omitted or, alternatively, include an indication that all the rows in block 110B are visible, so in this sense the MVCC block 200 may have reduced storage requirements in memory, when compared to the list or RS vector types.

Moreover, the visible type may reduce the need to look at the creation timestamp(s) for the rows 110 mapped to CRS MVCC block 106B.

When the header 205 includes, as a type, the invisible stub, the invisible stub type may indicate that the data portion 210 corresponds to rows that are all invisible, in accordance with some embodiments. For example, the invisible stub type indicates that all of the block of rows such as 110B are considered invisible and thus invisible to some threads. To illustrate further, the invisible stub in the block header 205 may indicate that all 1K rows (e.g., 1024-2048 rows of block 110B in table 102) are invisible. Referring to FIG. 1, when the block 106A includes a header having a invisible stub indication, the range of rows 110B in table 202 are all invisible. When this is the case, the data portion 210 of the block may be omitted or, alternatively, include an indication that all the rows in block 110B are invisible, so in this sense the MVCC block 200 may have reduced storage requirements in memory, when compared to the list or RS vector types.

In some example embodiments, one or more of the CRS MVCC blocks may be configured to represent with a visible stub header indication at 205 a contiguous set of visible rows, such as one or more row blocks 110A, 110B, etc.

In some example embodiments, one or more CRS blocks may be configured to represent with an invisible stub header indication at 205 a contiguous set of invisible rows, such as one of the row blocks 110A, 110B, etc.

In some implementations, the CRS MVCC block(s) may provide memory savings. Moreover, the CRS MVCC blocks may enable memory re-use and/or sayings.

Referring again to FIG. 1 as well as FIG. 2, the MVCC information including row state for any given row or block of rows may change from time to time. For a given CRS MVCC block, the data portion 210 including the row state information for a corresponding block of rows 110A, 110B, etc. may change. And, the corresponding header 205 may change type as well.

Figure 3A:
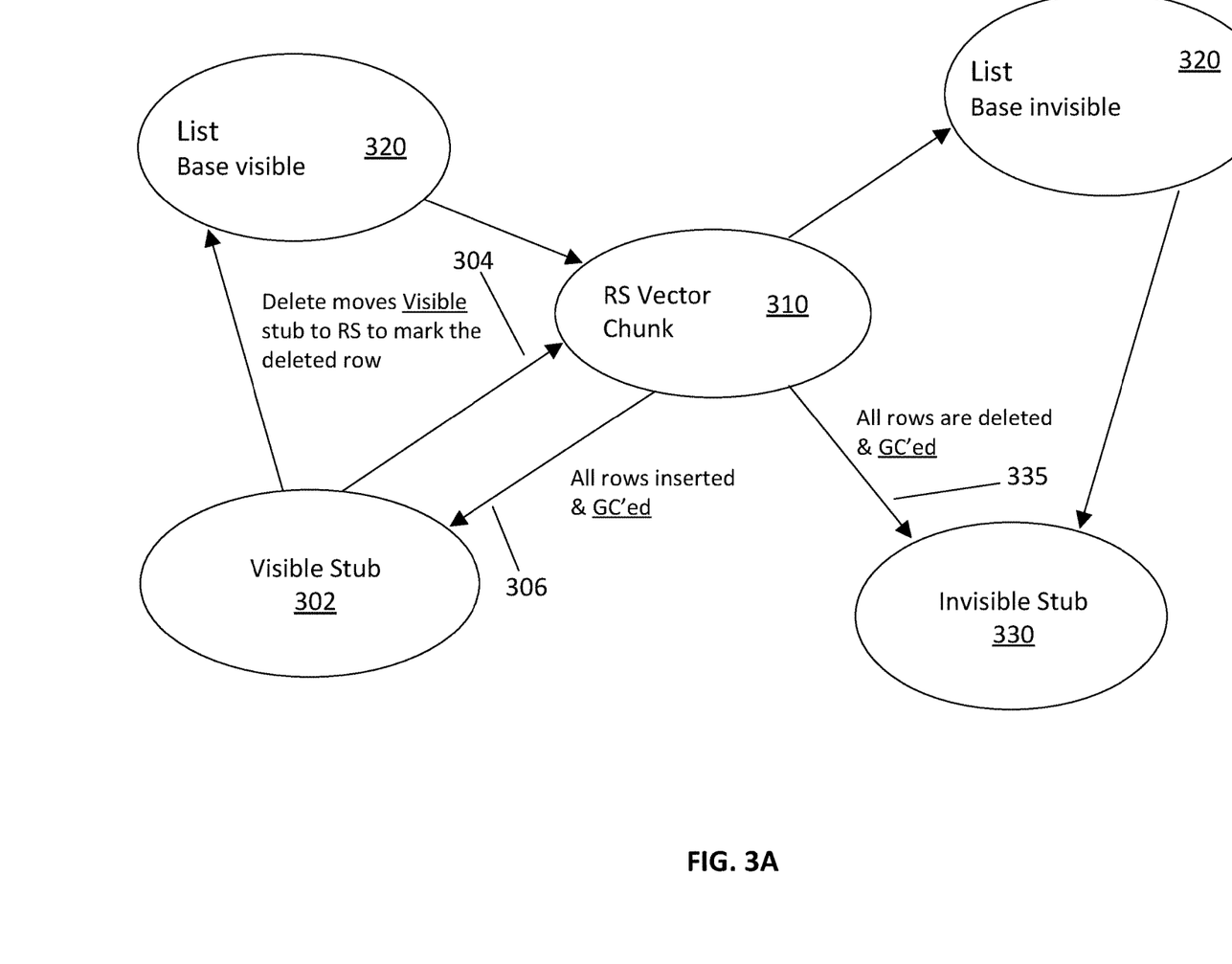
FIG. 3A depicts an example of a state transition diagram among different types of CRS MVCC blocks, in accordance with some example embodiments.

FIG. 3A depicts a state diagram for the possible changes in the types associated with the header 205, in accordance with some example embodiments. As noted, the block type may change states among the following types: list 320, RS vector 310, invisible 330, and visible 302. When the block type corresponds to a visible stub 302, the visible stub type 302 may change to another state. For example, if there is a deletion (at 304) to a row in rows 110A which is being handled by CRS MVCC block 106A, the block 106A is no longer "all" visible, so the block type may be changed to another type, such as to RS vector type 310, although the visible stub type may also change to other types such as the list type 320 as well.

When the block type corresponds to RS vector 310 and all rows in the range 110A corresponding to block 106A are committed (and garbage collected, for example), the rows are all visible. When this is the case, the CRS MVCC block type for those rows may be changed at 306 to the visible stub type state 302. When the CRS block type is RS vector 310 and all rows all rows in the range 110A corresponding to block 106A are deleted (and garbage collected, for example), the rows are invisible. When this is the case, the CRS MVCC block type for those rows can be changed, at 335, to invisible stub 330.

In some implementations, a CRS MVCC block 200 may initially be configured with a type of list or a type of RS vector. In order to save memory, the CRS MVCC block may be initially configured with RS vector type, which is relatively memory compact when compared to the list type.

When this is the case, a block type at the header 205 may transition to visible stub (as noted above with respect 306) or may transition to invisible stub (as noted above with respect 335). Although FIG. 3A depicts the transitions from the RS vector type state 310 to and from the visible stub 302 state and the invisible stub 330 state, the transitions may be from the list type 320 to and from the visible stub 302 state and the invisible stub 330 state as well. Moreover, the state diagram of FIG. 3A as other state transitions may be implemented as well.

Switching the CRS MVCC block types may be synchronized to avoid losing data. This synchronization may ensure that data written by the writer is copied to a new representation. Supposing for example that thread T1 and thread T2 are writing to a list block type and there is only one empty slot in the list and then one of the threads needs to switch the list to RS vector representation. If thread T1 got the last slot in the block and T2 is switching the list type to RS vector type, the thread T2 must wait until thread T1 completes its modification before copying the list data into the bit-vector.

In some embodiments, synchronization may be used to provide consistent MVCC information including row state information.

With respect to a data reader reading MVCC block information for example, the reader may perform an atomic read on a versioned vector and may get the MVCC block's 200 information. Once the MVCC block information is available to the reader, the MVCC block information will not be destroyed or re-used until the current reader completes its read operation of the MVCC block's information (e.g., header 205 and/or data 210). The MVCC block information may be handled through a garbage collector, and may be handled in a manner similar to moving a timestamp block from active queue to a garbage collection (GC) queue before recycling the timestamp block. The reader may read in a lock-less state.

With respect to a data writer writing MVCC information, the writer may acquire the read-write switch lock in a read mode to complete the write operation to an MVCC block 200. If the write cannot be done due to lack of availability of the space in the current MVCC block 200 representation, the writer may switch to a new MVCC block representation before writing the row state data in the new MVCC block representation.

Figure 3B:
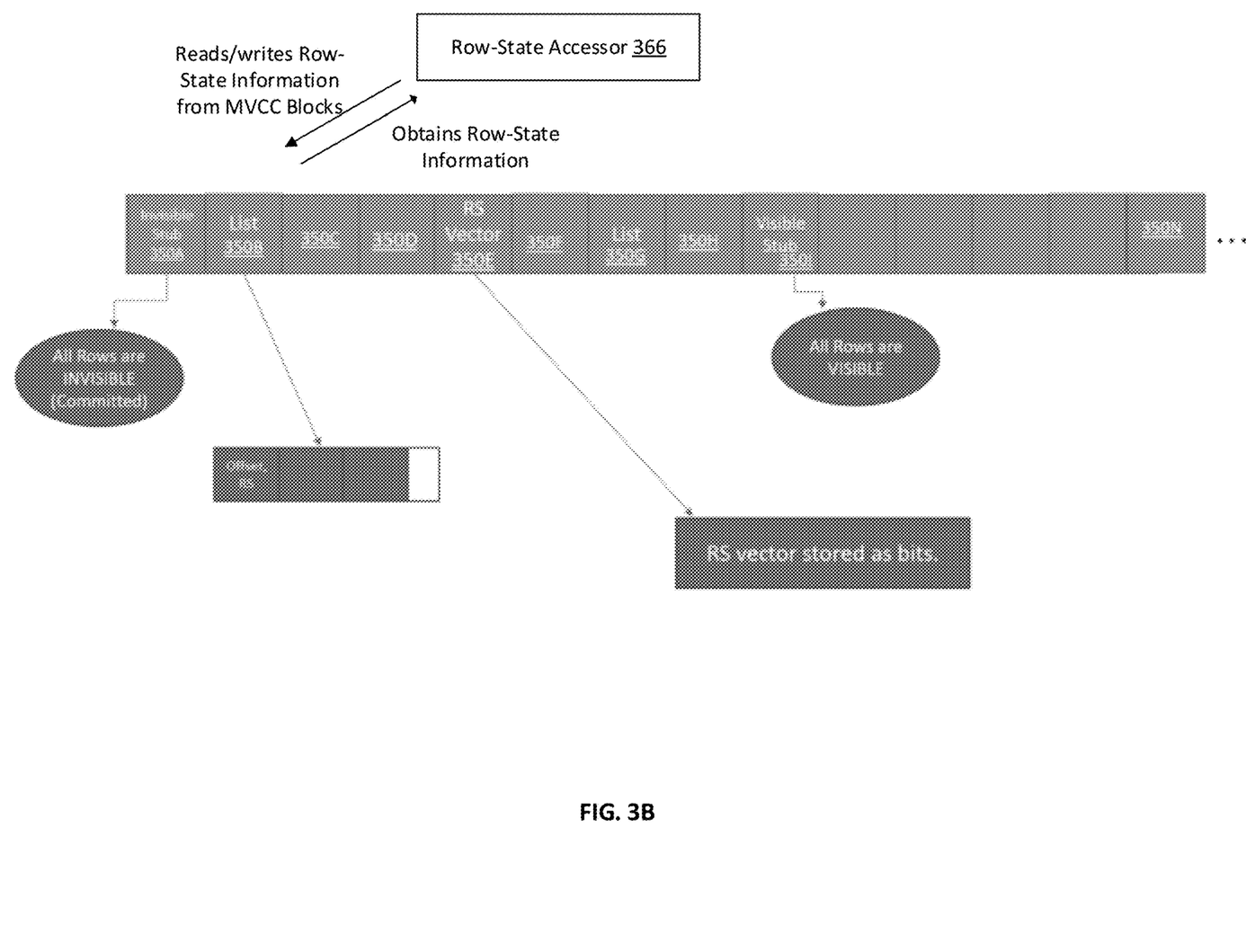
FIG. 3B depicts CRS MVCC blocks, in accordance with some example embodiments.

FIG. 3B depicts an example row state accessor 366 operating on CRS MVCC blocks, such as MVCC blocks 106A-C and the like. The row state accessor may accesses the row state information of the row blocks 110A-C in table 102, for example. In the example of FIG. 3B, the first MVCC block 350A corresponds to the first 1K rows 110A in table 102. The first MVCC block 350A includes a header indicating a type invisible 350A. In this example, the row state accessor assess that the first 1K rows 110A are invisible to threads. In the example of FIG. 3B, the second MVCC block 350B corresponds to the second 1K rows 110B. The second MVCC block 350B includes a header indicating a type list 350B. In this example, the row state accessor would read the data portion (e.g., 210) to assess the row Mate of a given row. And, the compressed MVCC block 350E indicates a type of RS vector, so the row state accessor can assess the state of a given row in that 1K block of rows using a row state vector. And, the compressed MVCC block 350I indicates a type of visible, so the row state accessor can determine that all of the rows in that 1K block of rows are visible.

As noted, the state of a row may change. As such, the CRS MVCC blocks may switch states from time to time as shown in the state diagram of FIG. 3A, for example. To switch state from one type to another for a given MVCC block, the row state accessor may acquire a lock in a write mode. Next, the current type for the CRS MVCC block may be checked and, if the current type is same as the required type, returns. For example, if the writer trying to replace bitvector rowstate block to visible stub finds the current block type as visible stub then there writer proceed with the existing stub block. But if the CRS MVCC block needs to be created with another type, the row state accessor creates an MVCC block so that it has the required type. For example, if type required at 350I is RS vector, the row state accessor creates an RS vector for the CRS MVCC block, and that RS vector would indicate the state of a block of rows (e.g., block 110A at table 102). And, then the row state accessor copies that RS vector information into the block 350I. If the newly, created representation is a visible stub or an invisible stub, the row state accessor does not need to copy any data into, for example, the data portion 210 of the CRS MVCC block. The row state accessor may replace information in the current CRS MVCC block with new information (and the old block information may be moved to a garbage collection queue). The switch lock may then be released or returned.

With respect to the list block type, the list type may be used as a way to save space for a 1K range of rowPos values, when there are relatively few rows being used. For example, rowPos values may be burned but an insert gets rolled back due to unique-key conflicts. If the entire 1K range of rows are inserted and committed and garbage collected and few rows are deleted in the current range of rows, then it (e.g., DTS is sparse timestamp block) may be implemented as a list representation with default value ROWSTATE_VIS-IBLE and the list of rows represents the row state of the deleted rows.

Table 1 below depicts a summary of when the switching states occurs between CRS MVCC block types.

TABLE I

| | |
|---|---|
| Bit-vector to Stub Visible | Cleanup Insert thread tries to switch to visible stub chunk whenever it finds all the entries are always-visible |
| Stub Visible to Bit-vector | Threads deleting the data from fragment will replace the stub visible chunk with bit-vector. |
| Bit-vector to Stub Invisible | Cleanup Delete thread will place invisible stub after all the delete timestamps are invisible |
| List chunk to Bit-vector | insert/update threads that writes new data to the fragment. |

When a row block 110B maps to a CRS MVCC Nock having a header type 205 indicating visible type, an entire range scan can skip all the rows 110B by treating them as all visible. If there are contiguous visible stub row state blocks, then the range scans may take advantage of additional savings. For example, getEstimatedVisibleRows( ) may be used to compute the value by going over the entire MVCC data block and to load the iterator for every data block boundary. This may be avoided whenever there is a super visible stub row state block by just pointing the iterator to the next super visible stub block. In order to compute or generate the required information, the super stub visible block may play a role. This information may be computed by walking over the row state accessor Whenever the iterator finds a visible stub or compute the entire visible super stub list while loading the MVCC fragment or while performing delta merge or optimize compression or repartition operations and use this list in the range API's. The former approach may not add any additional memory overhead but the former approach may perform more atomic reads on the row state vector (worst case double the number of elements in the row state vector). But the later approach may consume some memory (may not be significant memory) and may need to synchronize or modified while deleting/inserting the rows. In order to keep balance between both the approaches, the visible super stub may be implemented for main fragment where only delete needs to modify the super visible stub information.

The following are some possible optimization where the row state block can be modified or switched to stubs without any lock to synchronize. The existing row state block may be replaced with INVISIBLE stub may not need a lock as the data associated with row state vector is same as the invisible stub. Any MVCC writes under exclusive mode (e.g., no other operations will be active on the table) will not require lock. Examples include loading of MVCC data, delta merge and optimize compression operation, and re-partition.

With respect to a visible MVCC fragment, if the table data is always visible (e.g., all the timestamp blocks are CTS stubs and row state information is row state visible stub), there is a scope for not allocating any memory for row state blocks and mark the MVCC fragment as visible MVCC fragment. If there is any future deletes, update, or inserts, then the row state information may be instantiate.

With respect to MVCC block iterators, they are used to optimize access to the MVCC blocks by avoiding repeated probes to the data (e.g., data 210 at FIG. 2), providing thus efficient access to the required data. APIs are provided to enable linear scans on the MVCC data associated with the entire fragment (MVCC data is represented as list of blocks). The APIs may also be provided to perform ad-hoc modifications or scans using a list of row positions of interest. The iterator may be implemented as a transient structure created when needed and destroyed after completion of a read or write (FIG. 1A shows the shared structure where the iterator can be implemented). For example, pointers to MVCC blocks 350A, 350B, and so forth may be cached based on the current row position (rowPos). The MVCC block iterator may use the cached pointers to the MVCC block until all the rows in the MVCC block are covered (e.g., either read or modified based on the current requirement). While a given read iterator is active on a MVCC block, any concurrent change in the type of the MVCC block should not affect the current read iterator as the reader always does an atomic read and caches the pointer to MVCC block (which will be consistent until the reads are complete). While the write iterator is active on the MVCC block, the write iterator synchronizes with any concurrent change in the type of layout to avoid losing its own write. If the current writer itself changes the layout then it has to refresh iterator metadata to with the newly created layout of the MVCC block.

To load MVCC data from an MVCC block, this may involve loading the timestamp information from the persistent MVCC pages and preparing the timestamp accessors to access the timestamp information. The timestamp accessor may manage timestamp blocks. The timestamp accessor may be located in the MVCC layer at the database management system 101. A client trying to access timestamp blocks interacts with timestamp accessor to get the required information. An iteration is performed over the insert and delete timestamps and initialize the row state information. If the current insert timestamp block is garbage collected and there no deletion timestamp in the MVCC block, the visible stub is placed for the row state of MVCC block. If the current insert and delete timestamp blocks are garbage collected, the invisible stub is placed for the row state of MVCC block. The rows associated with insert and delete timestamp blocks are gone over to enable computation of the row state. If the insert timestamp is always_visible and no delete timestamp is present, the row state of the row is set to visible. If both the insert and delete timestamp values of the row are always visible, the row state is invisible. All other cases, the row state may be determined based on the insert and delete timestamp values and the system read snapshot timestamp. In other words, the row-state information may be computed using the timestamp information.

Figure 3C:
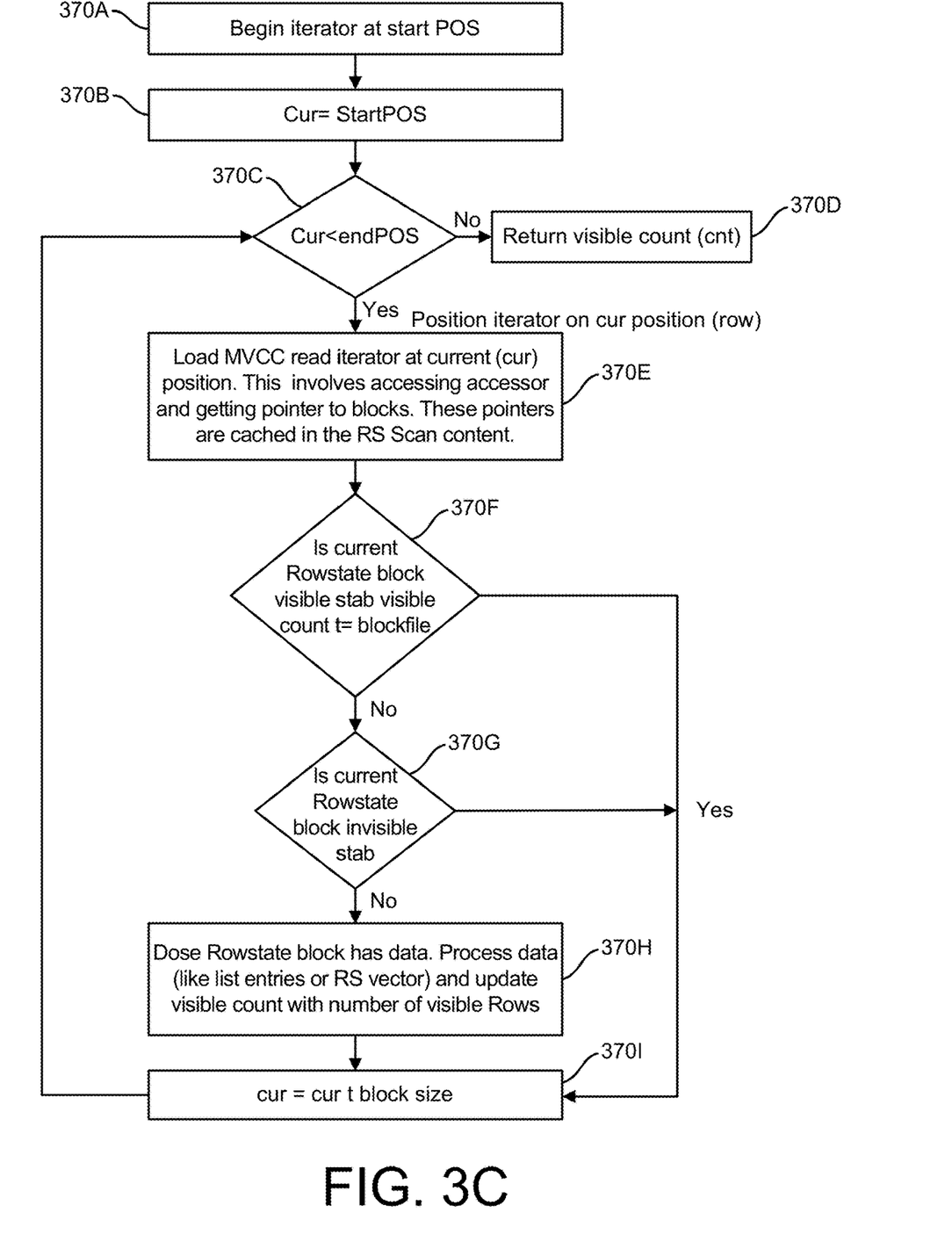
FIG. 3C depicts a read iteration process of the CRS MVCC blocks, in accordance with some example embodiments.

FIG. 3C depicts a process flow for a reader using an interator that iterates over MVCC blocks 106A, 106B, 106C, 350A, 350B, etc. The description of FIG. 3C also refers to FIGS. 1 and 3B. The iterator may go over a range or a set of data items. The iterator may return data by accessing block information once for the entire block of rows, instead of accessing block information for every row or element in the block.

At 370A, the iterator starts at a starting row position in an MVCC block (e.g., block 106A), so the current position is set as the starting position at 370B. If the current row position is greater than or equal to the end position of an MVCC block (no at 370C), the count of visible types in the block is returned (370D) to a caller of the API. If the current row position in an MVCC block is less than the end row position of that MVCC block (yes at 370C), the MVCC read iterator is loaded with the current MVCC block (e.g., MVCC block 350B) being processed and a row position in that current MVCC block (370E). This may involve accessing an accessor to obtain pointers to the current block and row. The pointers may be cached in row state scan context.

If the row state of the current MVCC block being processed is a visible stub (yes at 370F), the visible count is incremented and the cur=cart block size (370I). If the row-state for the current MVCC block being processed is not visible stub (no at 370F), a check is performed (370G) to determine whether the current row state of the current MVCC block is invisible. If so (yes at 370G), then 370I. If not (no at 370G), a check is performed to determine whether the row state of the current MVCC block being processed includes data (370G). If so, the data, such as RS vectors or list, are processed at 370 and the visible count is updated with the number of visible rows in the current MVCC block. The process at FIG. 3C may then repeat for other blocks, such as MVCC block 350D and so forth.

Figure 3D:
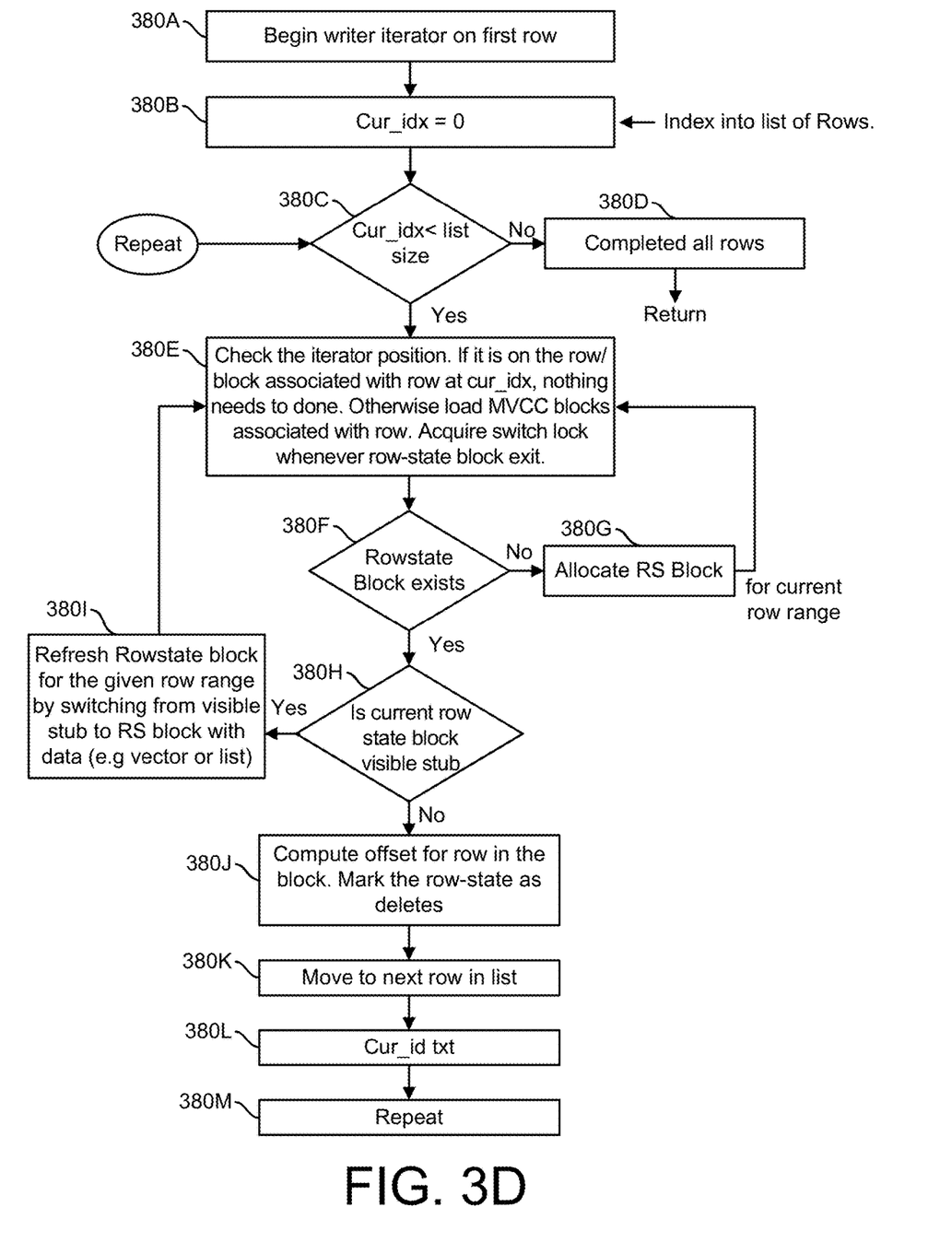
FIG. 3D depicts a write iteration process of the CRS MVCC blocks, in accordance with some example embodiments.

FIG. 3D depicts a process flow for the writing using an interator over MVCC blocks. The description of FIG. 3D also refers to FIGS. 1 and 3B.

At 380A, a writer iterator starts at a first row of a current MVCC block, such as one of the blocks 350A, 350B, etc. At 380B, the current index is set initially as zero ("cu_idx=0"). This index points to the current row being processed in a given MVCC block. If current index is not less than the list size (no at 380), all the rows for that MVCC block have been processed (380D). In this example, the writer may write to row-state blocks may use an iterator.

If current index is less than the list size (yes at 380C), there are rows to process in the current MVCC block. At 380E, the row position of the iterator is checked. If the row position is on a row of an MVCC block associated with the row at cur_idx, required synchronization is already in-place. Otherwise, the MVCC block associated with a row is loaded, and switch lock is acquired whenever the row state block exists. In other words, the block information is accessed and required synchronization is acquired only once per block. If the current position of the iterator is on the required block, the iterator may proceed writing, otherwise the iterator may load the block information and acquire required switch lock.

If the MVCC block does not exists (no at 380F), a row state block is allocated at 380G. If the MVCC block does exists (yes at 380F), a check is performed to determine whether the current MVCC block is visible stub (380H). If so (yes at 380H), the MVCC block is refreshed for the given row range by switching (380I) from invisible stub to RS block having data (e.g., RS vector type or list type). If not (no at 380H), an offset of the row is computed in the MVCC block, and the row state is marked as deleted (380J). Next, the writer iterator moves to the next row in the list (380K), and the current index (curew_idx) is incremented (380L). This process may be repeated (380M).

Figure 4:
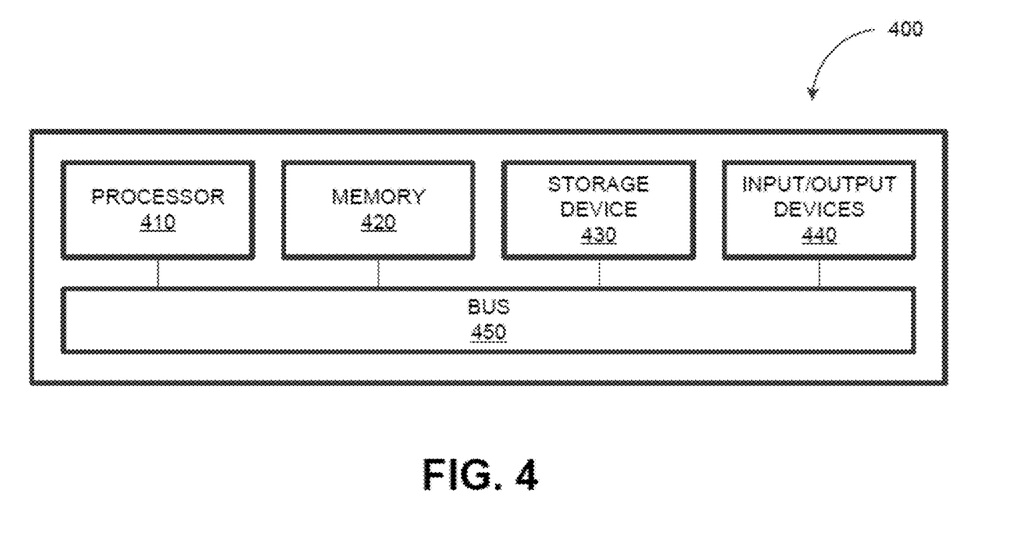
FIG. 4 depicts a block diagram illustrating a computing system, in accordance with some example embodiments.

FIG. 4 depicts a block diagram illustrating a computing system 400 consistent with implementations of the current subject matter. The computing system 400 may be used to host the database management system 101 and/or provide one or more clients such as client 199 which couple to the database management system 100.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 299. In some implementations, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440, such as a screen, keyboard, and/or other input/output devices.

The memory 420 is a computer readable medium such as volatile or non-volatile that stores information within the computing system 400. The memory 420 can store instructions and/or other data associated with the processes disclosed herein. The storage device 430 is capable of providing persistent storage for the computing system 400. The storage device 430 can be a floppy disk device, a hard disk device, an optical disk device, a tape device, or other suitable persistent storage means. The input/output device 440 provides input/output operations for the computing system 400. In some example embodiments, the input/output device 440 includes a keyboard and/or pointing device. In various implementations, the input/output device 440 includes a display unit for displaying graphical user interfaces.

According to some example embodiments, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some example embodiments, the computing system 400 can be used to execute various interactive computer software applications that can be used for organization, analysis and/or storage of data in various formats. Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, cause operations comprising:
        accessing a multi-version concurrency control block providing row state for a block of rows in a table of a database, the multi-version concurrency control block including a header portion and a data portion, the header portion including a type indicator indicating whether all of the rows of the block are visible to a plurality of threads at a database management system or invisible to the plurality of threads at the database management system, wherein the type indicator further indicates, for the row state of all of the rows of the block, a row state vector type representation or a list type representation, wherein in response to the type indicator indicating a visible type or an invisible type, skipping a read of all of the rows of the block of the data portion of the block, wherein in response to the row state vector type representation or the list type representation, reading the data portion of the block.

2. The system of claim 1, further comprising:
changing the type indicator from the row state vector type representation or the list type representation to the visible type.

3. The system of claim 1, wherein when the visible type indication is present in the header portion, the data portion is empty, and wherein when the row state vector type representation or the list type representation are present, the data portion includes the row state for each row in the block at the table of the database.

4. The system of claim 1, further comprising:
changing the type indicator from an invisible type indicating all of the rows of the block are invisible to the plurality of thread to a row state vector type representation or a list type representation for the row state of each of the plurality of rows in the table of the database.

5. The system of claim 3, further comprising:
changing the type indicator from the row state vector type representation or the list type representation to the invisible type.

6. The system of claim 1, wherein the accessing comprises a write to the multi-version concurrency control block, the write performed under a lock to inhibit changes to the multi-version concurrency control block.

7. The system of claim 1, wherein the accessing further comprises:
accessing a plurality of multi-version concurrency control blocks, each of the multi-version concurrency control blocks mapped to a corresponding set of rows in the table of the database, a first multi-version concurrency control block having a visible type, a second multi-version concurrency control block having an invisible type, and a third multi-version concurrency control block having a list type or a row state vector type.

8. The system of claim 7 further comprising:
iterating over the plurality of multi-version concurrency control blocks to obtain to obtain the row state of the corresponding set of rows in the table of the database, wherein a row state accessor reads, as part of the iteration, a first header portion of the first multi-version concurrency control block to determine the row state as being the visible type without reading a first data portion of the first multi-version concurrency control block,
wherein the row state accessor reads, as part of the iteration, a second header portion of the second multi-version concurrency control block to determine the row state as being the invisible type without reading a second data portion of the second multi-version concurrency control block, and
wherein the row state accessor reads, as part of the iteration, a third header portion of the third multi-version concurrency control block, and when the third header portion indicates the list type or the row state vector type, further reading the third data portion of the third multi-version concurrency control block to determine the row state.

9. A method comprising:
accessing a multi-version concurrency control block providing row state for a block of rows in a table of a database, the multi-version concurrency control block including a header portion and a data portion, the header portion including a type indicator indicating whether all of the rows of the block are visible to a plurality of threads at a database management system or invisible to the plurality of threads at the database management system, wherein the type indicator further indicates, for the row state of all of the rows of the block, a row state vector type representation or a list type representation, wherein in response to the type indicator indicating a visible type or an invisible type, skipping a read of all of the rows of the block of the data portion of the block, wherein in response to the row state vector type representation or the list type representation, reading the data portion of the block.

10. The method of claim 9, further comprising
changing the type indicator from the visible type indicating all of the rows of the block are visible to the plurality of threads to the row state vector type representation or the list type representation for the row state of each of the plurality of rows in the table of the database.

11. The method of claim 10, further comprising:
changing the type indicator from the row state vector type representation or the list type representation to the visible type.

12. The method of claim 9, wherein when the visible type indication is present in the header portion, the data portion is empty, and wherein when the row state vector type representation or the list type representation are present, the data portion includes the row state for each row in the block at the table of the database.

13. The method of claim 9, further comprising:
changing the type indicator from an invisible type indicating all of the rows of the block are invisible to the plurality of thread to a row state vector type representation or a list type representation for the row state of each of the plurality of rows in the table of the database.

14. The method of claim 12, further comprising:
changing the type indicator from the row state vector type representation or the list type representation to the invisible type.

15. The method of claim 9, wherein the accessing comprises a write to the multi-version concurrency control block, the write performed under a lock to inhibit changes to the multi-version concurrency control block.

16. The method of claim 9, wherein the accessing further comprises:
accessing a plurality of multi-version concurrency control blocks, each of the multi-version concurrency control blocks mapped to a corresponding set of rows in the table of the database, a first multi-version concurrency control block having a visible type, a second multi-version concurrency control block having an invisible type, and a third multi-version concurrency control block having a list type or a row state vector type.

17. The method of claim 16 further comprising:
iterating over the plurality of multi-version concurrency control blocks to obtain to obtain the row state of the corresponding set of rows in the table of the database, wherein a row state accessor reads, as part of the iteration, a first header portion of the first multi-version concurrency control block to determine the row state as being the visible type without reading a first data portion of the first multi-version concurrency control block,
wherein the row state accessor reads, as part of the iteration, a second header portion of the second multi-version concurrency control block to determine the row state as being the invisible type without reading a second data portion of the second multi-version concurrency control block, and wherein the row state accessor reads, as part of the iteration, a third header portion of the third multi-version concurrency control block, and when the third header portion indicates the list type or the row state vector type, further reading the third data portion of the third multi-version concurrency control block to determine the row state.

18. A non-transitory computer-readable medium including instructions which, when executed by the at least one data processor, causing operations comprising:

accessing a multi-version concurrency control block providing row state for a block of rows in a table of a database, the multi-version concurrency control block including a header portion and a data portion, the header portion including a type indicator indicating whether all of the rows of the block are visible to a plurality of threads at a database management system or invisible to the plurality of threads at the database management system, wherein the type indicator further indicates, for the row state of all of the rows of the block, a row state vector type representation or a list type representation, wherein in response to the type indicator indicating a visible type or an invisible type, skipping a read of all of the rows of the block of the data portion of the block, wherein in response to the row state vector type representation or the list type representation, reading the data portion of the block.

19. The non-transitory computer-readable medium of claim 18, changing the type indicator from the visible type indicating all of the rows of the block are visible to the plurality of threads to a row state vector type representation or a list type representation for the row state of each of the plurality of rows in the table of the database.

* * * * *